United States Patent
Bodette et al.

(10) Patent No.: US 8,502,618 B2
(45) Date of Patent: Aug. 6, 2013

(54) MEASUREMENT AND CONTROL OF ELECTROMAGNETIC INTERFERENCE

(75) Inventors: Edward J. Bodette, Cary, NC (US);
Michael Crowder, Cary, NC (US);
Rudolf Rehquate, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 12/334,050

(22) Filed: Dec. 12, 2008

(65) Prior Publication Data

US 2010/0148883 A1   Jun. 17, 2010

(51) Int. Cl.
*H04B 3/30* (2006.01)
(52) U.S. Cl.
USPC .............................. 333/12; 333/17.1; 333/185
(58) Field of Classification Search
USPC ........................................... 333/12, 185, 17.1
See application file for complete search history.

(56) References Cited

U.S. PATENT DOCUMENTS

| | | | |
|---|---|---|---|
| 5,327,316 A | 7/1994 | Yi | |
| 5,852,613 A * | 12/1998 | Nagatani et al. | 370/546 |
| 6,016,084 A | 1/2000 | Sugimoto | |
| 6,104,200 A | 8/2000 | Hook | |
| 6,274,951 B1 | 8/2001 | Saikalis et al. | |
| 6,492,942 B1 | 12/2002 | Kezys | |
| 6,597,321 B2 | 7/2003 | Thursby | |
| 6,885,258 B2 * | 4/2005 | Suzuki | 333/12 |
| 7,408,423 B2 * | 8/2008 | Asano | 333/12 |
| 7,786,621 B2 * | 8/2010 | Joodaki | 307/91 |
| 2005/0016761 A9 | 1/2005 | Anthony, Jr. et al. | |
| 2006/0173285 A1 | 8/2006 | Mallozzi et al. | |
| 2007/0029662 A1 | 2/2007 | Lee | |
| 2007/0117434 A1 | 5/2007 | Joodaki | |
| 2007/0222697 A1 | 9/2007 | Caimi et al. | |
| 2007/0241977 A1 | 10/2007 | Vance | |

FOREIGN PATENT DOCUMENTS

| | | |
|---|---|---|
| JP | 7113659 | 12/1995 |
| JP | 2004336191 A | 11/2004 |

OTHER PUBLICATIONS

Otake Toshio, et al., "Bibliographic data: JP 7113659 (B)—Noise Application Induction Device", espacenet, http://worldwide.espacenet.com/publicationDetails/biblio?CC=JP&NR=7113659B&KC=B, Dec. 6, 1995, 1 page.
"Electromagnetic compatibility", wikipedia, http://en.wikipedia.org/wiki/Electromagnetic . . . , Oct. 17, 2008, pp. 1-11.
Whelan, Tony,"How does a transistor work?" Physlink.com, http://www.physlink.com/Education/Ask . . . , Oct. 17, 2008, pp. 1-3.
"PIN diode", wikipedia, http://en.wikipedia.org/wiki/PIN_diode, Sep. 29, 2008, pp. 1-4.
"Diode", wikipedia, http://en.wikipedia.org/wiki/Diode, Oct. 17, 2008, pp. 1-9.

* cited by examiner

*Primary Examiner* — Robert Pascal
*Assistant Examiner* — Kimberly Glenn
(74) *Attorney, Agent, or Firm* — Thomas E. Tyson; Jeffrey L. Streets

(57) ABSTRACT

The average EMR emissions of an electronic device may be reduced by implementing an electrically-active modulated termination. For example, the impedance may be continuously varied at one or more termination locations between two metal substructures to cause a like variation in the amplitude of each component of the EMR. According to one approach, cyclically varying the electrical impedance with a period of less than the time interval over which the EMR is measured will result in a reduction in the average measured EMR.

13 Claims, 5 Drawing Sheets

MEASUREMENT AND CONTROL OF ELECTROMAGNETIC INTERFERENCE

BACKGROUND OF THE INVENTION

1. Field of the Invention

The present invention relates to measuring and controlling electromagnetic interference caused by electronic devices.

2. Background of the Related Art

Electromagnetic interference ("EMI") is a problem wherein an electronic circuit radiates unwanted electromagnetic radiation ("EMR"), i.e. electromagnetic noise, having the potential to interfere with the operation of other electronic circuits. Metal substructures within an electronic system often serve as efficient radiating or reflecting antennas for EMR. Examples of such metal substructures include, but are not limited to, processor heatsinks, printed circuit board ("PCB") reference planes, and interconnecting brackets. Existing approaches to controlling EMR include adding a Faraday shield around the entire metal substructure, or reducing the size of apertures in a metal enclosure to improve shielding at higher frequencies. Spread-spectrum clocking is also an option, but is not compatible with many circuits that cannot tolerate the resulting clock skew. Reducing EMI is particularly challenging at higher processor clock frequencies because the correspondingly smaller EMR wavelengths are more difficult to contain by conventional shielding methods.

BRIEF SUMMARY OF THE INVENTION

One embodiment provides a method comprising continuously varying an electrical impedance at one or more termination locations between first and second substructures that radiate electromagnetic noise to continuously vary the amplitude of the electromagnetic noise at a particular frequency.

Another embodiment provides an electronic system having a signal generator for generating an electronic signal. A first metal substructure and a second metal substructure electrically coupled to the electrical signal generator radiate electromagnetic noise from the signal generator. An impedance controller is configured to continuously vary the impedance at one or more termination locations between the two metal substructures to continuously vary the amplitude of the electromagnetic noise at a particular frequency of the electromagnetic noise.

DETAILED DESCRIPTION OF THE INVENTION

Embodiments of the invention include a method and system for controlling the electromagnetic noise radiated by resonant metal substructures using an electrically-active modulated termination. An electrically-active modulated termination may be implemented in an electronic system using an impedance controller to continuously vary impedance at termination locations between selected metal substructures. The impedance controller continuously varies the amplitude at each frequency of the electromagnetic noise radiation (EMR) by continuously varying (e.g. cyclically varying) the impedance between the metal substructures. The metal substructures experience a corresponding continuous change in their antenna characteristics, including the antenna's resonant frequency, the antenna gain, and the electromagnetic radiation pattern at particular frequencies. The continual changes in these antenna characteristics cause the antenna to continuously vary between a more and less efficient radiator. As a result, the amplitude of the EMR at each particular frequency will vary continuously when measured from any particular direction. While continuously varying the amplitude of the EMR signal components at each frequency does not necessarily reduce the total radiated energy or the peak emissions (over the entire range of EMR frequencies), it will reduce the average measured EMR if the period of each cycle is shorter than the time interval over which the EMR is measured by the test receiver. This can be an effective way to meet electromagnetic compatibility ("EMC") regulatory limits, for which the acceptable level of average emissions is lower than for peak emissions. This also has the potential to reduce interference with other systems as a result of lowering the average emissions.

Figure 1:
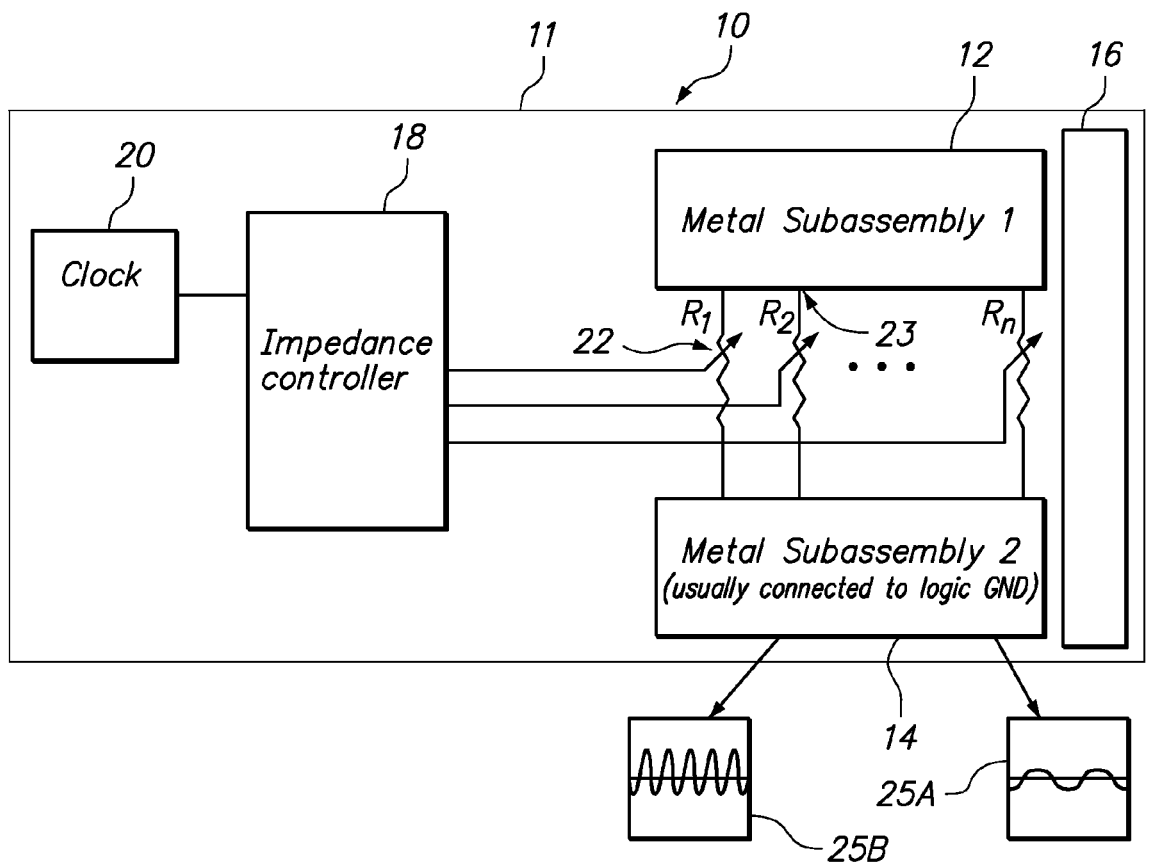
FIG. 1 is a schematic block diagram of an electronic device according to an embodiment of the invention

FIG. 1 is a schematic block diagram of an electronic device 10 according to an embodiment of the invention. The electronic device 10 includes a chassis 11 that supports a first metal substructure 12 and a second metal substructure 14 electrically coupled to a signal generator 16. The signal generator 16 can include any circuit or group of circuits in the electronic device 10 that generate an electronic signal having EMR, as a byproduct. For example, the signal generator 16 may include an integrated circuit, such as a processor of a computer system, operating at a particular frequency or range of frequencies, and additionally producing electromagnetic noise in the form of EMR at one or more frequencies that may be independent of the operating frequency.

Integrated circuits are often the source of EMI, but they are generally never the "antenna." Rather, such circuits couple their energy to larger metal substructures, such as heatsinks, circuit board planes, and cables, to radiate enough EMR to cause interference with other electronic circuits. In the embodiment of FIG. 1, the metal substructures 12, 14 cooperatively function as an antenna to radiate EMR. The radiated EMR has the potential to interfere with other electronic circuits within the electronic device 10 or the circuits of other electronic devices outside the chassis 11. The EMR generated by the electronic device 10 may include multiple EMR components, each at a different frequency and radiated in different directions by different metal substructures. The EMR noise waveform may be very complex, but may be approximated in the time domain as a series of sine wave components each having a different amplitude $A_i$ and frequency $f_i$, i.e., $A_1 \sin(2*pi*f_1*t) + A_2 \sin(2*pi*f_2*t) + \ldots + A_i \sin(2*pi*f_i*t)$. The frequency ($f_1$ to $f_i$) of each of these components will not ordinarily change because they are dictated by the operating frequencies within the device itself. By way of example, first and second exemplary EMR components 25A, 25B are shown. The first EMR component 25A at some first frequency is radiated at a first remote position relative to the electronic device 10 and the second exemplary EMR component 25B at another comparatively higher second frequency is radiated at another remote position relative to the electronic device 10.

Each component of EMR generated in an electronic device typically has a constant frequency and amplitude at the point of generation (at the EMR-generating circuits, themselves). The frequency ($f_1$ to $f_i$) of the components will typically not change because they are dictated by the operating frequencies within the device 10 itself However, an impedance controller 18 included with the electronic device 10 electronically controls the amplitude ($A_1$ to $A_i$) at the particular frequencies of the respective EMR components, by continuously varying the impedance at one or more locations (the "termination locations") 23 between two metal substructures 12, 14. Continuously varying the impedance may be implemented by continuously cycling the impedance across a range of impedance. A plurality of spaced-apart variable resistors 22 (labeled "$R_1$" to "$R_n$") are coupled between the metal substructures 12, 14 at the termination locations 23. The termination locations 23 provide electrical pathways between the two metal substructures 12, 14. The impedance controller 18 varies the resistance value at each variable resistor 22 in a cyclical fashion, as governed by a clock 20. The time-varying resistance value may be a periodic function, including but not limited to a generally sinusoidal function. Varying the impedance changes the resonant frequency and radiation pattern of the antenna comprised by the two metal substructures 12, 14. This causes the antenna to cycle between a more and less efficient radiator, which results in a continuous change to the amplitude (i.e., amplitude modulation) of the EMR at a given frequency. This continuous change in amplitude results in a lower average value at each frequency than would be measured without modulating the impedance.

Figure 2:
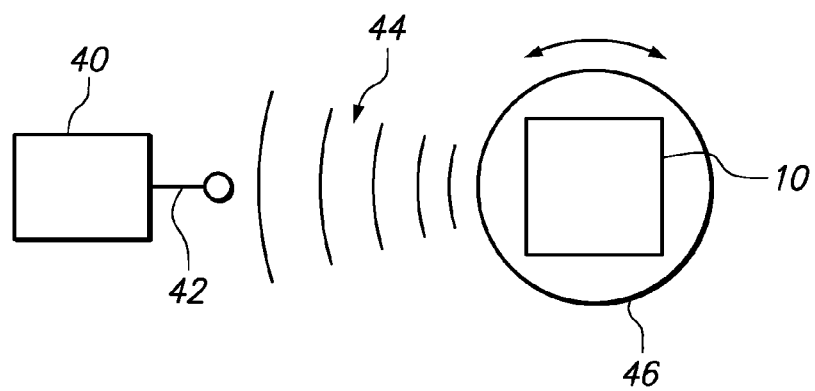
FIG. 2 is a schematic diagram of an EMC testing scenario wherein the EMR radiated by the device under test may be measured.

FIG. 2 is a schematic diagram of an EMC test receiver and an electronic device illustrating how the EMR 44 radiated by the electronic device 10 (the "device under test") may be measured by a test receiver 40. During an initial scan of EMR, an antenna 42 on the receiver 40 detects the EMR 44 radiating from the electronic device 10. The receiver 40 amplifies this signal and sweeps across a broad frequency range while measuring peak power at its input. After correcting for antenna factors, cable loss, and amplification, the value of the electric field of the measured EMR is calculated and compared to a threshold value established by regulations. The antenna 42 and test receiver 40 are stationary, so the electronic device 10 itself may be slowly rotated 360 degrees on a turntable 46 to cumulatively receive the EMR emanating in different directions from the electronic device 10. After the frequencies of highest EMR are recorded, the receiver is reconfigured such that it no longer sweeps, but rather "dwells" on a particular frequency while recording both the peak and the average value of the EMR. The turntable is rotated and the antennas are moved up and down to locate the direction of maximum EMR for one of these frequencies. Once this point is located, the data (average and peak values of the EMR) is captured and compared to the regulatory limits once again to determine final compliance with the regulations. This procedure is repeated for each of the frequencies identified in the initial scan.

Figure 3A:
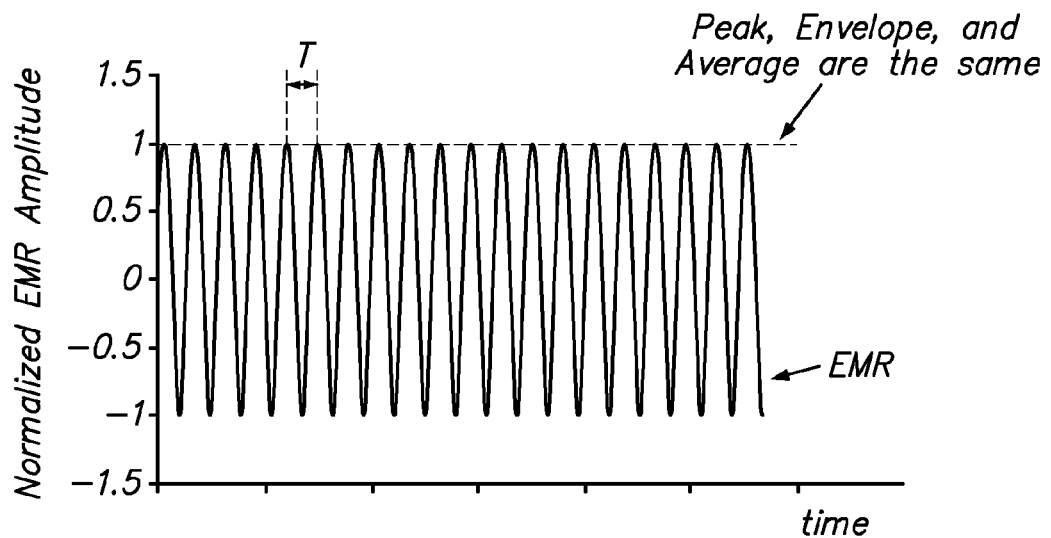
FIG. 3A is a representative plot of an exemplary time-varying EMR component generated at a particular remote position by the device of FIG. 1.

FIG. 3A is a representative plot of an exemplary EMR component at a single frequency, e.g., $A_1 \sin(2*pi*f_1*t)$, without modulating the impedance between metal substructures. The waveform represents how the peak value of the EMR amplitude at a particular location remains relatively constant when the impedance is not varied between two metal substructures 12, 14 of FIG. 1. The vertical axis represents the normalized amplitude, and the horizontal axis represents time. The sinusoidal plot has a period "T," a frequency $f=1/T$, and a wavelength $\lambda=c/f$ where c is the speed of light. The frequency f may be, for example, 2 GHz.

Figure 3B:
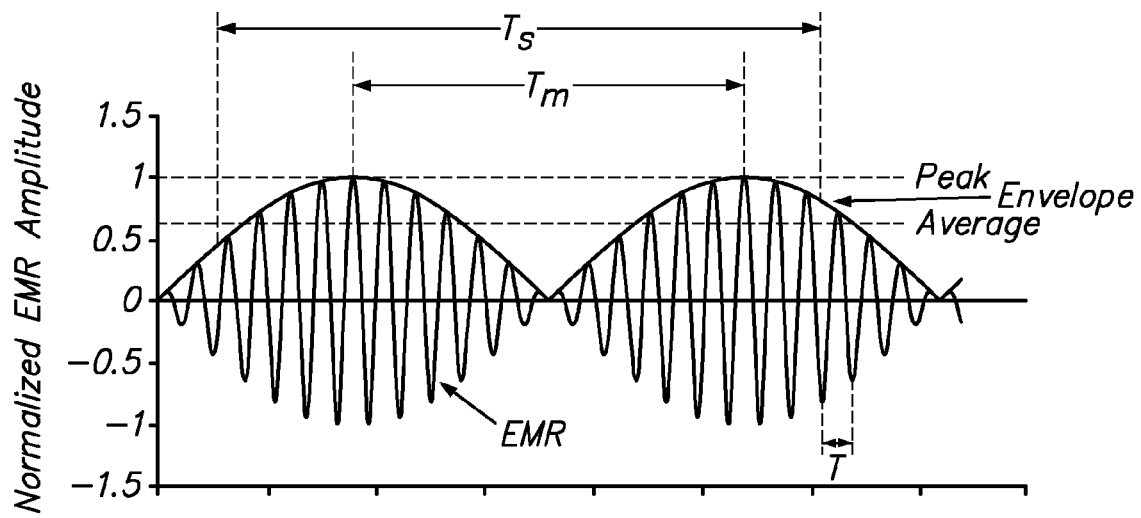
FIG. 3B is a representative plot of the time-varying EMR component having been modified by modulating the impedances between two metal structures.

FIG. 3B is a representative plot of the EMR component $A_1 \sin(2*pi*f_1*t)$ having been varied by cyclically varying the impedance between two metal substructures 12, 14 of FIG. 1. Although not required, the time-varying EMR frequency exhibits a generally sinusoidal amplitude behavior in this example. The frequency of modulation $f_m=1/T_m$, where $T_m$ is the period of modulation. For purposes of illustration only, the period of the EMR in FIG. 3B ($f=1/T$) relative to the period of modulation $T_m$, has been exaggerated in FIG. 3B, in comparison to what would normally be encountered in EMC measurements.

Different test receivers employ different methods for deriving their average measurements, but functionally, virtually all test receivers average the input power within a specified time interval. For EMR measurements above 1 GHz, $T_s$ the "sampling interval" is typically about 100 ms, while the resolution bandwidth of the receiver itself may be 1 MHz. The averaging function can be conceptually illustrated by drawing an "envelope" that follows the peaks of a wave at the particular frequency being measured, as shown in FIG. 3A and FIG. 3B. A peak value indicates the highest sine wave peak, and an average value can be derived by averaging the time-varying amplitude of the envelope over the sampling time interval $T_s$. FIG. 3B illustrates the envelope waveform of the EMR that results from varying the impedances between metal substructures, while a straight line in FIG. 3A represents the envelope of the unmodified EMR As a result of varying the amplitude of the EMR such that the EMR envelope waveform completes at least one cycle within the sampling interval $T_s$, the average value of the EMR is noticeably lower than that in FIG. 3A. If the modulation frequency ($f_m=1/T_m$) were instead sufficiently low that the EMR envelope waveform did not complete at least one cycle within the sampling interval $T_s$, then the average value would not be constant, but would actually vary slowly between the maximum and minimum value. In such a circumstance, because regulatory requirements dictate that the maximum value be recorded, no reduction in emissions would be realized at low modulation frequencies. For this reason, it is desirable that the sampling interval $T_s$ be greater than the modulation period $T_m$.

To illustrate with an example, if the device under test is radiating EMR at 2 GHz, the receiver's average detector may provide a measurement of the power at its input between 1.9995 GHz and 2.0005 GHz, averaged over a sampling interval of 100 ms. Because of this 100 ms sampling interval, the modulation frequency of the impedance should be faster than the reciprocal of the sampling interval $T_s$, which in this example would be 10 Hz, in order to realize a reduction in the measured emissions. If the modulation rate is slower than this, then the average EMR measurement for a given measurement frequency may equal the peak measurement, such that no EMR reduction results. Thus, an exemplary EMR measurement may involve receiving a portion of the EMR within a selected bandwidth B, averaging the intensity of the received portion of the EMR over a selected sampling interval $T_s$, and cyclically varying the electrical impedance between two EMR-radiating metallic structures with a period $T_m$ (i.e. $1/f_m$) of less than the sampling interval $T_s$.

During measurement of EMR from an electronic device, the average intensity of the EMR at a particular frequency may be compared to a threshold value, such as a regulatory limit. If the average intensity exceeds the threshold value, the period of cyclically-varying impedance may be reduced in response, until the average measured intensity is less than the threshold value. In this manner, the electronic device 10 may be "tuned" to comply with regulatory requirements that set forth average EMR limits. This may be implemented, for example, using a comparator circuit. The comparator circuit may be included with the electronic device 10 or the test receiver. The comparator may compare the averaged intensity to a threshold value (e.g. regulatory limit) and output an indication of the comparison, e.g. an indication of whether or not the electronic device 10 is in compliance with a certain regulatory requirement.

Figure 4:
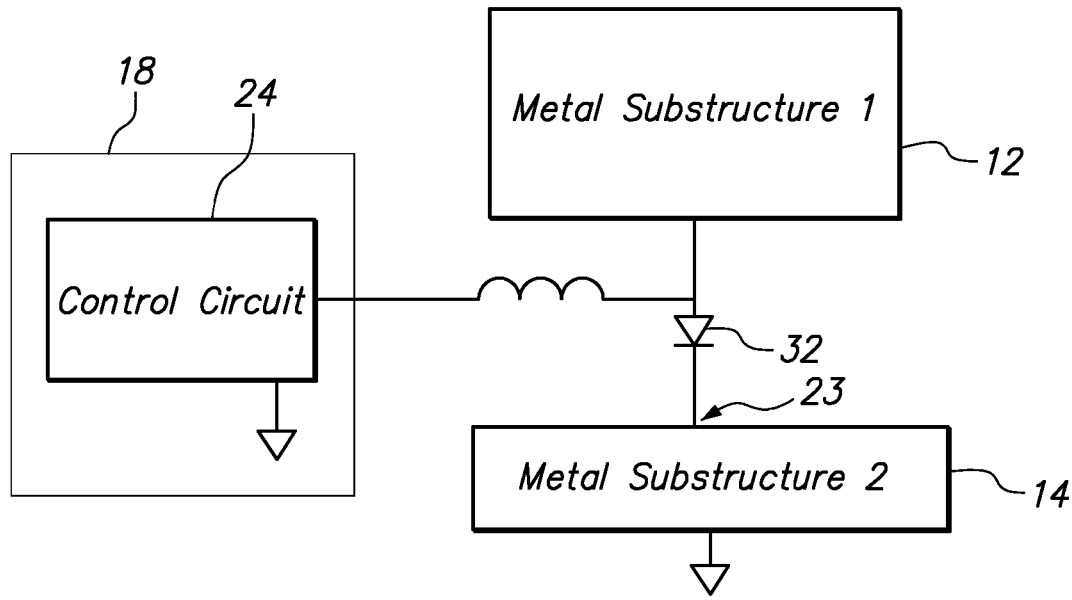
FIG. 4 is a schematic block diagram of one example implementation of the device of FIG. 1, wherein the impedance at a termination location between the two metal substructures is varied by controlling the current through a PIN diode.

The embodiment of the electronic device 10 of FIG. 1 may be implemented in a variety of ways. FIG. 4 is a schematic block diagram of one example implementation of the electronic device 10 of FIG. 1, wherein the impedance at a termination location between the two metal substructures 12, 14 is varied by varying the current through a PIN diode 32. The acronym "PIN" refers to a semiconductor stack of P-type, Intrinsic, and N-type materials known in the art. The impedance at RF frequencies can be controlled by a low frequency current bias provided by a control circuit 24 included with the impedance controller 18. At lower alternating current ("AC") frequencies, or lower direct current ("DC"), the PIN diode 32 may behave similarly to a conventional "PN" diode by rectifying an input signal. However, at higher AC frequencies (with or without DC loading), the PIN diode 32 behaves like a passive resistor. Within a specified range of the higher current levels, the resistance varies with the forward current until saturation is reached. Thus, the PIN diode 32 may exhibit the behavior of a variable resistor, with a resistance value that can be controlled by controlling the current through the PIN diode 32. By varying the forward current through the PIN diode 32 at a controlled rate, the control circuit 24 can vary the effective RF resistance of the PIN diode 32, making it well suited for use as a termination device.

Figure 5:
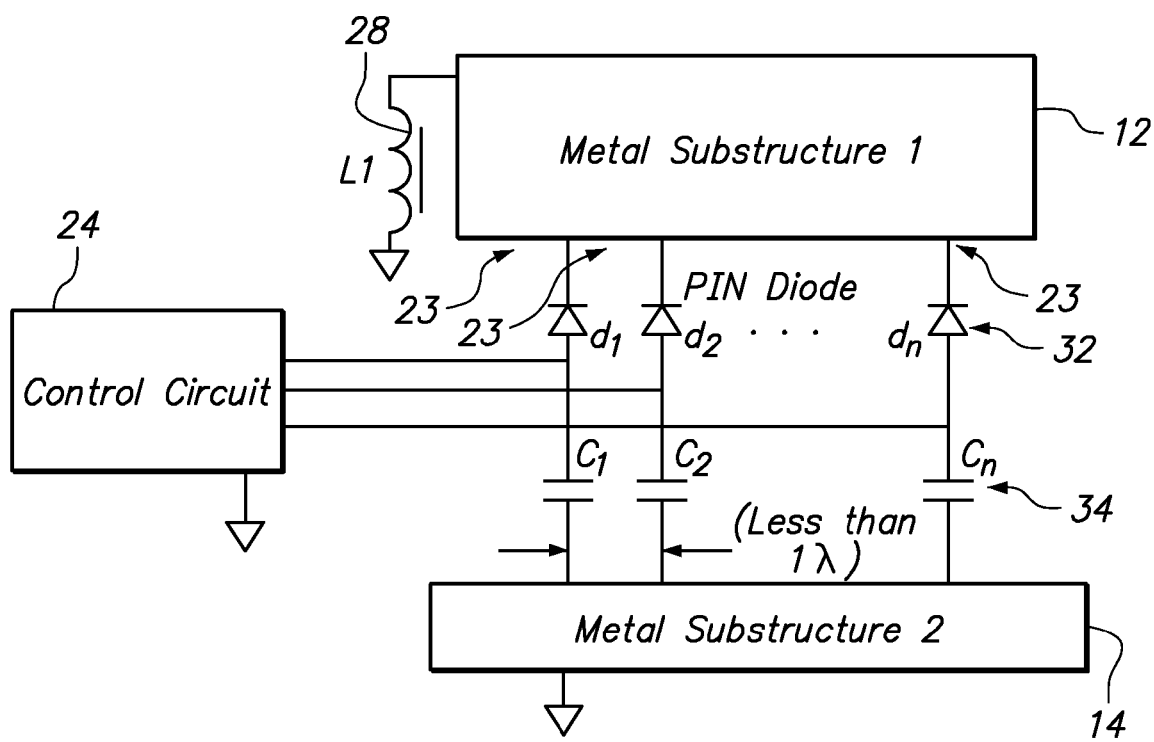
FIG. 5 is a schematic block diagram of another example implementation of the device of FIG. 1, wherein the impedance at multiple termination locations is varied by controlling the current through spaced apart PIN diodes.

FIG. 5 is a schematic block diagram of another exemplary implementation of the electronic device 10 of FIG. 1, wherein the impedance at multiple termination locations 23 is varied by controlling the current through a plurality of spaced apart PIN diodes 32 ("$d_1$" to "$d_n$") provided at the termination locations 23. A ferrite bead or inductor 28 having an inductance L1 couples the first metal substructure 12 to ground. The ferrite bead 28 has a low impedance at the diode modulation rate to provide a path for the diode control current, yet has a high impedance at the EMR frequencies to prevent unintentionally connecting the metal structures to ground at these higher frequencies. Each PIN diode 32 may be used to individually control the impedance between the metal substructures 12, 14 at the respective termination locations 23. The direction of the PIN diodes 32 is reversed with respect to the orientation of the single diode 32 in FIG. 4. Isolating capacitors 34 ("$C_1$" to "$C_n$") and the ferrite bead 28 permit individual control of the current through each PIN diode 32.

The blocking capacitors 34 also permit the two metal substructures 12, 14 to remain at the same DC voltage potential. The control circuit 24 in this implementation may consist of individual current sources that are varied to individually adjust the impedance value provided by each PIN diode 32 at the respective termination location 23.

The use of multiple PIN diodes 32 also helps provide more uniform control of the EMR radiated by the electronic device 10. For example, if the substructures 12, 14 are large compared to the wavelengths of the measured time-varying EMR, varying impedance at only one of the termination locations 23 may have little effect on the EMR emanating from locations more than about one EMR wavelength away from that termination location 23. Providing the diodes 32 at the multiple termination locations 23 and spacing the diodes 32 at a distance of less than about the maximum value of the wavelength of the time-varying EMR will provide a more effective control and reduction in the average measured emissions. In other instances, the diodes may be spaced greater than one wavelength, because wavelengths are relatively small at very high frequencies. For example, the wavelength at 10 GHz is only 3 cm. However, varying the impedance at many termination points spaced somewhat greater than 1 wavelength may still reduce the average measured EMR. Thus, according to another embodiment, the maximum spacing between the diodes may be limited to less than about twice the wavelength of the EMR.

The invention may be embodied in a variety of specific applications to control electromagnetic noise radiated by metal substructures. Examples of applications include the connection between an adapter bracket and a card ground (see FIG. 6), the termination between card ground screws and a sheet metal chassis (see FIG. 7), and terminations added between a heatsink and the ground plane (see FIG. 8).

Figure 6:
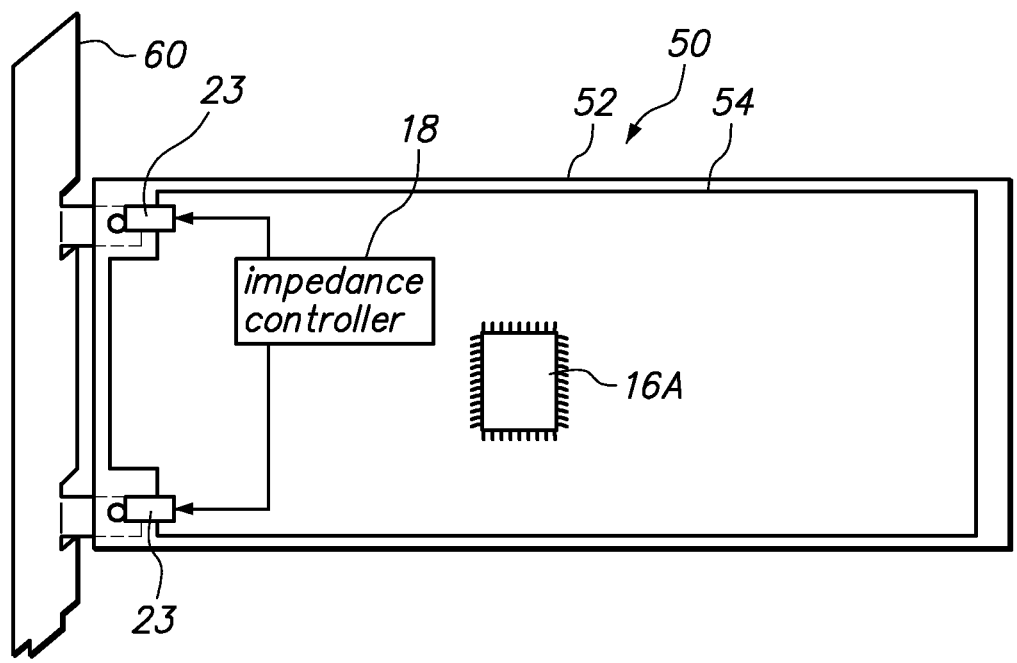
FIG. 6 is a side view of an embodiment of the invention implemented in a system that includes an electronic hardware card connected to an adapter bracket.

FIG. 6 is a side view of an embodiment of the invention implemented in a system that includes an electronic hardware card 50 connected to an adapter bracket 60. The hardware card 50 includes a multi-layer printed circuit board (PCB) 52, including a metallic ground layer 54. The ground layer 54 is a conductive metal layer to which various circuits on other layers of the PCB 52 may be electrically grounded. A processor chip 16A is one example of a circuit that may be grounded directly to the ground layer 54. The hardware card 50 is electrically coupled to the adapter bracket 60 at termination locations 23. The ground layer 54 of the hardware card 50 and the bracket 60 are two metal substructures capable of radiating electromagnetic noise generated by the processor chip 16A and other circuits (not shown). The ground plane 54 and the bracket 60 act as antennas due to their relatively large surface areas. The impedance between the ground plane 54 and the bracket 60 may be continuously varied by the impedance controller 18 to reduce the average EMR radiated by the ground plane 54 and the bracket 60.

Figure 7:
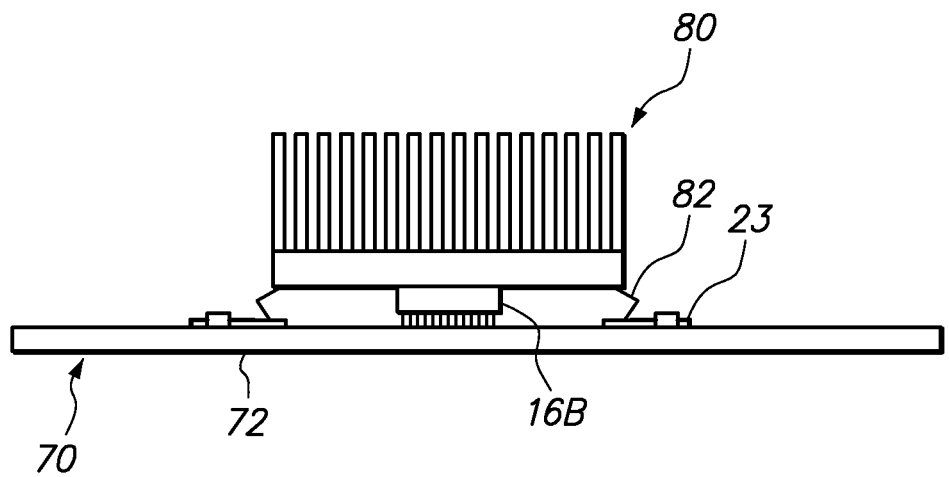
FIG. 7 is a side view of an embodiment of the invention implemented in a system that includes a PC motherboard with an attached heat sink.

FIG. 7 is a side view of an embodiment of the invention implemented in a system that includes a computer motherboard 70 with an attached heat sink 80. The motherboard 70 may have one or more metallic ground layer or other metallic layer to which another processor chip 16B is connected. The heatsink 80 is electrically connected to the metallic layer(s) at one or more termination locations 23 by heatsink clips 82 that secure the heat sink 80 to the motherboard 70. In this embodiment, the metallic layer of the motherboard 70 and the heatsink 80 are two metal substructures that act as antennas to radiate noise generated by the processor chip 16B or other circuits on the motherboard 70. The impedance between the ground plane and the heat sink 80 may be continuously varied by the impedance controller, which could be a sub-circuit of the processor chip 16B in this example, to reduce the average radiated EMR.

Figure 8:
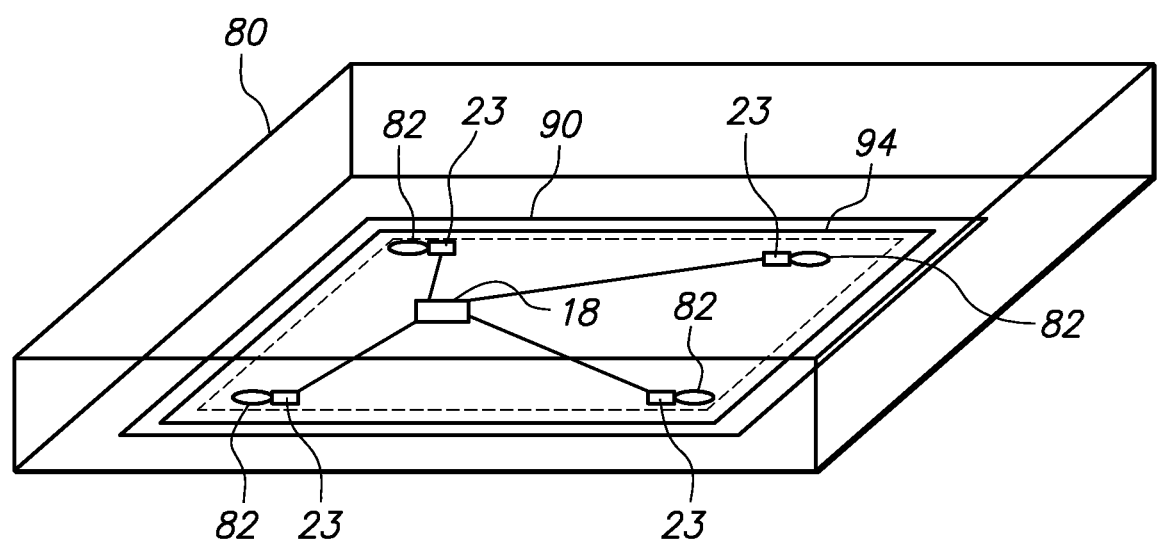
FIG. 8 is a perspective view of another embodiment of the invention implemented in a system that includes a circuit card attached to a metal enclosure by four screws that electrically connect a ground plane of the circuit card to the enclosure.

FIG. 8 is a perspective view of another embodiment of the invention implemented in system that includes a circuit card 90 attached to a metal enclosure 80 by four screws 82. The screws 82 electrically connect a ground plane 94 of the circuit card 90 to the enclosure 80. EMR generated by the circuit card 90 is radiated by the enclosure 80 and the ground plane 94, which act as antennas. The screws 82 electrically couple the enclosure 80 with the circuit card 90 at termination locations 23. The impedance controller 18 is used to cyclically vary the impedance between the enclosure 80 and the circuit card 90 at the termination locations 23 to reduce the average emissions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
continuously and simultaneously varying an electrical impedance at a plurality of termination locations between first and second substructures that radiate electromagnetic noise to continuously vary an amplitude of a component of the electromagnetic noise at a particular frequency.

2. The method of claim 1, wherein the plurality of termination locations are spaced at a distance of less than about a maximum value of the wavelength of the electromagnetic noise component.

3. A method, comprising:
continuously varying an electrical impedance at one or more termination locations between first and second substructures that radiate electromagnetic noise to continuously vary an amplitude of a component of the electromagnetic noise at a particular frequency, wherein the step of varying the electrical impedance at the one or more termination locations between the first and second substructures comprises flowing electrical current through one or more spaced-apart PIN diodes coupling the first and second metal substructures and varying the electrical current to vary a resistance of the PIN diodes.

4. A method, comprising:
continuously varying an electrical impedance at the one or more termination locations between first and second substructures that radiate electromagnetic noise to continuously vary an amplitude of a component of the electromagnetic noise at a particular frequency;
receiving a portion of the electromagnetic noise within a selected bandwidth; and
averaging an intensity of the received portion of the electromagnetic noise over a selected sampling interval, wherein continuously varying the electrical impedance includes cyclically varying the electrical impedance with a period of less than the sampling interval.

5. The method of claim 4, further comprising:
comparing the averaged intensity to a threshold value; and
decreasing the period of varying the electrical impedance in response to the average intensity exceeding the threshold value.

6. An electronic system, comprising:
a signal generator for generating an electronic signal;
a first metal substructure and a second metal substructure electrically coupled to the electrical signal generator for radiating electromagnetic noise from the signal generator; and
an impedance controller for continuously varying an electrical impedance at one or more termination locations between the two metal substructures to continuously vary the amplitude of a component of the electromagnetic noise at a particular frequency of the electromagnetic noise.

7. The electronic system of claim 6, wherein the impedance controller further comprises:
a PIN diode at each of the one or more termination locations; and
a variable current supply having a control circuit for supplying a continuously varying electrical current across the PIN diodes.

8. The electronic system of claim 7, wherein the impedance controller further comprises:
a ferrite bead coupling the first metal substructure to ground; and
a capacitor in series between each PIN diode and the second metal substructure.

9. The electronic system of claim 6, further comprising
an EMI receiver for receiving a portion of the electromagnetic noise within a selected bandwidth and averaging an intensity of the received electromagnetic noise over a selected sampling interval; and
wherein the impedance controller is configured to cyclically vary the electrical impedance with a period of less than the averaging sampling interval.

10. The electronic system of claim 9, further comprising a comparator for comparing the averaged intensity to a threshold value and outputting an indication of the comparison.

11. The electronic system of claim 6, wherein the first metal substructure comprises a ground plane of a multi-layered circuit board and the second metal substructure comprises a bracket for mounting the circuit board.

12. The electronic system of claim 6, wherein the first metal substructure comprises a ground plane of a multi-layered circuit board and the second metal substructure comprises a heatsink mounted to the circuit board.

13. The electronic system of claim 6, wherein the first metal substructure comprises a ground plane of a multi-layered circuit board and the second metal substructure comprises an enclosure in which the circuit board is mounted.

* * * * *